| United States Patent [19] | [11] Patent Number: 4,608,230 |
| --- | --- |
| DiMartini et al. | [45] Date of Patent: Aug. 26, 1986 |

[54] Pb-Sn-Sb-Ag SOLDER ALLOY

[75] Inventors: Carl DiMartini, Piscataway; John Lane, Westfield, both of N.J.

[73] Assignee: Fry Metals, Inc., Altoona, Pa.

[21] Appl. No.: 708,075

[22] Filed: Mar. 4, 1985

[51] Int. Cl.$^4$ .............................................. C22C 11/06
[52] U.S. Cl. .................... 420/566; 420/571
[58] Field of Search ............................... 420/566, 571

[56] References Cited

U.S. PATENT DOCUMENTS

| 1,087,561 | 2/1914 | Tebbetts | 420/571 |
| 2,198,240 | 4/1940 | Boegehold | 420/571 |
| 2,306,667 | 12/1942 | Smith | 420/566 |

FOREIGN PATENT DOCUMENTS

| 118416 | 11/1942 | Australia | 420/566 |
| 0002348 | 1/1969 | Japan | 420/571 |

*Primary Examiner*—L. Dewayne Rutledge
*Assistant Examiner*—Robert L. McDowell
*Attorney, Agent, or Firm*—Salter & Michaelson

[57] ABSTRACT

A solder alloy which is particularly effective for use in automotive radiator applications comprises 87.5%–96.5% lead, 3%–10% tin, 0.5%–2.0% antimony, and 0–0.5% silver. The solder has high mechanical strength, is resistant to galvanic corrosion, and is readily solderable.

3 Claims, No Drawings

Pb-Sn-Sb-Ag SOLDER ALLOY

BACKGROUND AND SUMMARY OF THE INVENTION

The instant invention relates to solders and more particularly to a novel solder alloy which is particularly effective for use in automotive radiator applications.

Generally, when a solder is used in an automotive radiator application, it is exposed to a relatively severe environment wherein it is subjected to fluctuating temperatures, mechanical vibration, immersion in a water-based fluid, and electrical connection to other dissimilar metals. Hence, in order for a solder to be effective for use in an automotive radiator application, it must have a relatively high degree of mechanical strength, and it must be highly resistant to corrosion. In addition, such a solder must be readily solderable to brass and other metals utilized in radiator constructions, and in order for it to be practical for use in the highly competitive automotive industry, it must be reasonably priced.

For many years, "30/70" solders comprising 30% tin and 70% lead were used extensively for automotive radiators. However, while these solders were highly resistant to corrosion, they had relatively poor high temperature mechanical properties, and they were relatively expensive. As a result, more recently a number of high lead solder alloys having substantially reduced tin contents have been developed, such as "5/95" alloys comprising 5% tin and 95% lead, and Modine alloys comprising 2.5% tin, 0.5% silver, and 97% lead, and these high lead solders have largely replaced the "30/70" solders in automotive radiator applications. However, while these high lead solder alloys have proven to be substantially less expensive than the earlier "30/70" solder alloys, and to also have substantially better mechanical properties than the "30/70" alloys, they have been found to be substantially more susceptible to corrosion over prolonged periods of use.

Generally, most of the corrosion which occurs in a solder alloy when it is used in an automotive radiator application is caused by galvanic action between the solder and the other metal components of the radiator which are in contact with the solder. Galvanic corrosion is caused when two dissimilar metals are placed in intimate contact with each other and immersed in an electrolyte. Under these conditions, an electrical potential is produced between the two metals and the less noble metal, i.e. the more active metal, becomes an anode and corrodes while the more noble metal becomes a cathode and remains substantially uncorroded. Since the metal components of radiators are normally made of metals, such as brass, which are more noble than most solders, the solder in a radiator normally becomes the anode in a galvanic reaction and it is therefore susceptible to corrosion. It has been found, however, that if the exposed surfaces of the solder in a radiator are protected by a corrosion resistant film, the galvanic action between the solder and the other metal components of a radiator can be substantially reduced. Further, it has been found that if a sufficient amount of tin is present in a solder alloy, the tin naturally forms a protective or passivating oxide layer on the surfaces of the solder, and this oxide layer, being substantially insoluble in water and most antifreezes, can be sufficient to protect the solder from the galvanic action which occurs in an automotive radiator. However, since a tin oxide layer of this type is inherently more brittle than the solder on which it is formed, any ductile deformation of the solder (via creep or plastic elongation) will result in mechanical damage to the film and cause increased corrosion in the solder. Hence, in order for a solder to be resistant to corrosion, it must not only be capable of producing a passivating surface film, but it also must have sufficient mechanical strength to make it resistant to creep deformation in order to avoid or at least minimize damage to the protective film.

Generally, all lead based alloys have very low yield points, and they are subject to some plastic deformation under even minimal loading conditions. Lead based alloys, such as solders, are particularly prone to creep deformation, which is a time-dependent plastic deformation of the material under load. Although creep deformation is usually only a matter of concern when the operating temperature to which a solder alloy is exposed exceeds one-half of the absolute melting temperature of the alloy, the solders used in automotive radiators are frequently exposed to conditions of this nature. Creep in lead based alloys is due both to intergranular sliding and to single grain elongation and therefore, in order to minimize creep deformation, both intergranular sliding and single grain elongation must be minimized.

The instant invention provides a solder alloy which has both high resistance to galvanic corrosion and also high resistance to creep deformation, making it highly effective for use in automotive radiator applications. The solder alloy of the instant invention consists essentially of 87.5%–96.5% lead, 3%–10% tin, 0.5%–2.0% antimony, and 0%–0.5% silver, the preferred alloy being approximatley 93.65% lead, 5% tin, 1.2% antimony, and 0.25% silver. It has been found that a solder alloy having these components in the specified concentrations is capable of producing an effective corrosion resistant passivating layer of tin oxide on the surfaces thereof when utilized in an automotive radiator environment, and it also exhibits sufficient resistance to creep deformation to minimize the damage to the passivating layer formed on the surfaces thereof when it is used in an automotive radiator application. It has also been found that a solder formed in accordance with the instant invention has effective solderability characteristics, and that it can be manufactured at a cost which makes it competitive with other solders which have been heretofore available for similar applications.

Accordingly, it is a primary object of the instant invention to provide an improved solder alloy for automotive radiator applications.

Another object of the instant invention is to provide a solder alloy which is highly resistant to corrosion from galvanic action, and also highly resistant to creep deformation.

Other objects, features and advantages of the invention shall become apparent as the description thereof proceeds.

DESCRIPTION OF THE INVENTION

The instant invention provides an improved solder alloy which is particularly effective for use in automotive radiator applications as well as for use in other applications where high strength and resistance to corrosion are of importance. The solder alloy of the instant invention consists essentially of 87.5%–96.5% lead, 3%–10% tin (preferably at least 5% tin), 0.5%–2.0% antimony, and 0%–0.5% silver (preferably at least 0.1% silver), and in its preferred form the alloy consists essentially of 93.65% lead, 5% tin, 1.2% antimony, and 0.25% silver. In this connection, it has been found that an alloy having concentrations within the ranges specified exhibits qualities of high resistance to galvanic corrosion and also high resistance to creep deformation, which make it significantly superior to the heretofore known solder alloys which have been used in automotive radiator applications. Preferably, the alloy of the instant invention is made so that it is substantially free from contaminants, although minor amounts of contaminates, such as copper, which don't have significant deleterious effects on the alloy, can be tolerated.

The improved characteristics of the solder alloy of the instant invention result from several factors. First, it has been unexpectedly found after extensive testing that a dramatic increase in the resistance of a lead based solder alloy to the galvanic corrosion which takes place in an automotive radiator environment occurs when the tin content of the alloy is increased to about 5%. Although an alloy having as low as 3% tin does have some resistance to corrosion, it has been found that a very significant increase in corrosion resistance occurs when the tin content is increased to 5% or more. Therefore, while the alloy of the instant invention can be made with a tin content which is as low as 3%, in order to maximize its resistance to corrosion, the solder alloy of the instant invention preferably comprises at least 5% tin. The tin content should be maintained below 10%, however, because higher tin concentrations tend to have deleterious effects on the mechanical strength of the alloy, and they also unnecessarily increase the cost of the alloy. In addition, it has been unexpectedly found that the combination of silver and antimony in the solder alloy of the instant invention provides an increased strength which is greater than the combined effects which these metals would have if present in the solder alloy by themselves. Specifically, it has been found that the presence of antimony in the alloy provides a high melting tin antimony phase at the lead grain boundry which significantly inhibits intergranular slippage, and the presence of antimony in combination with silver provides silver and antimony precipitates within the primary lead grains which inhibit single grain elongation or dislocation movement. Accordingly, the combination of silver and antimony in the alloy of the instant invention provides increased strength which results from the ability of the alloy to inhibit both types of creep deformation mechanisms. In addition to the improved mechanical strength and resistance to corrosion, it has been found that the alloy of the instant invention is readily solderable and it can be manufactured at a cost which is relatively competitive with other solders which have been used for automotive radiator applications. Further, it has also been found that the same qualities which make the solder alloy of the instant invention effective for automotive radiator applications make it attractive for a number of other applications, and hence a variety of other uses for the solder alloy of the instant invention are contemplated.

EXAMPLE

A solder alloy containing 93.65% lead, 5% tin, 1.2% antimony and 0.25% silver was prepared and extensively tested in an automotive radiator environment where it was exposed to a conventional automotive radiator coolant. It was found that the alloy corroded at a rate which was approximately one-half of that which was experienced in similar tests of "5/95" alloy and approximately one-sixth of that which was experienced in similar tests of a Modine alloy. The alloy of the instant invention was found to be far superior to the "5/95" and the Modine alloys in stress tests. Its material cost was found to be higher than the "5/95" alloy, but less than the Modine alloy, and it was found to have satisfactory solderability qualities.

It is seen therefore that the instant invention provides an effective alloy which has improved qualities as compared to other solders which have been heretofore available for use in automotive radiator applications. Further, since the solder can be manufactured competitively from a price standpoint, and since its solderability is well within the tolerable range, the alloy of the instant invention has substantial advantages over the heretofore available solder alloys. Hence for these reasons as well as the other reasons hereinabove set forth, it is seen that the alloy of the instant invention represents a significant advancement in the art which has substantial commercial merit.

As this invention may be embodied in several forms without departing from the spirit or essential characteristics thereof, the present embodiment is therefore illustrative and not restrictive, since the scope of the invention is defined by the appended claims rather than by the description preceeding them, and all changes that fall within the metes and bounds of the claims or that form their functional as well as conjointly cooperative equivalents, are therefore intended to be embraced by these claims.

What is claimed is:

1. A solder alloy consisting essentially of 87.5%–96.5% lead, 3%–10% tin, 0.5%–2.0% antimony, and approximately 0.25% silver.

2. The solder alloy of claim 1 further characterized as consisting essentially of approximately 93.65% lead, 5.0% tin, 1.2% antimony, and 0.25% silver.

3. In the solder alloy of claim 1, the concentration of said tin being at least 5%.

* * * * *